United States Patent
Kao

(10) Patent No.: US 7,901,090 B2
(45) Date of Patent: Mar. 8, 2011

(54) ADJUSTABLE REFLECTIVE MIRROR MODULE AND PROJECTION APPARATUS USING THE SAME

(75) Inventor: Fu-Shun Kao, Hsinchu (TW)

(73) Assignee: Coretronic Corporation, Hsin-Chu (TW)

( * ) Notice: Subject to any disclaimer, the term of this patent is extended or adjusted under 35 U.S.C. 154(b) by 984 days.

(21) Appl. No.: 11/740,932

(22) Filed: Apr. 27, 2007

(65) Prior Publication Data

US 2008/0007702 A1 Jan. 10, 2008

(30) Foreign Application Priority Data

Jul. 4, 2006 (TW) .............................. 95124290 A

(51) Int. Cl.
  *G03B 21/28* (2006.01)
  *G03B 21/22* (2006.01)
(52) U.S. Cl. ........................................ 353/98; 353/119
(58) Field of Classification Search ................. 353/119, 353/98, 99, 81, 122; 359/831, 871, 833, 359/834, 838, 290–297, 872, 876, 878; 248/466, 248/475.1
See application file for complete search history.

(56) References Cited

U.S. PATENT DOCUMENTS

| | | | |
|---|---|---|---|
| 5,402,184 A | 3/1995 | O'Grady et al. | |
| 6,059,412 A * | 5/2000 | Sugita | 353/37 |
| 6,676,267 B2 * | 1/2004 | Takase | 359/872 |
| 6,813,441 B2 * | 11/2004 | Yamazaki | 396/82 |
| 6,880,934 B2 | 4/2005 | Lee | |
| 2005/0254020 A1 * | 11/2005 | Kim et al. | 353/98 |
| 2007/0247597 A1 * | 10/2007 | Lin et al. | 353/98 |

FOREIGN PATENT DOCUMENTS

| | | |
|---|---|---|
| JP | 8-194261 | 7/1996 |
| JP | 2001-33873 | 7/1999 |
| JP | 2003-215433 | 7/2003 |
| TW | 467296 | 12/2001 |

\* cited by examiner

*Primary Examiner*—Que T Le
*Assistant Examiner*—Pascal M Bui-Pho
(74) *Attorney, Agent, or Firm*—Jianq Chyun IP Office

(57) ABSTRACT

A reflective mirror module for being fixed on a housing having a plurality of through holes is provided. The reflective mirror module includes a fixing support, a reflective mirror, a leaf spring, and a plurality of adjusting screws. The fixing support has a plurality of threaded holes. The reflective mirror is disposed on the fixing support, and the leaf spring is disposed between the fixing support and the housing. Moreover, the leaf spring has a plurality of guiding openings, and the positions of the guiding openings and the threaded holes are corresponding to the positions of the through holes. The adjusting screws pass through the through holes and the guiding openings, and are secured in the threaded holes of the fixing support. Through the adjustment of the adjusting screws, the position of the reflective mirror is adjusted precisely. Additionally, a projection apparatus using the reflective mirror module is provided.

9 Claims, 8 Drawing Sheets

ADJUSTABLE REFLECTIVE MIRROR MODULE AND PROJECTION APPARATUS USING THE SAME

CROSS-REFERENCE TO RELATED APPLICATION

This application claims the priority benefit of Taiwan application serial no. 95124290, filed Jul. 4, 2006. All disclosure of the Taiwan application is incorporated herein by reference.

BACKGROUND OF THE INVENTION

1. Field of Invention

The present invention relates to a reflective mirror module. More particularly, the present invention relates to a reflective mirror module having adjustable reflective mirror.

2. Description of Related Art

In a projection apparatus, a reflective mirror used to change the light path is normally disposed on the inner wall of the housing of the optical engine in a fixed manner. However, as the angle at which the reflective mirror is placed has errors, the blue band phenomenon of the projected images occurs, which is solved by attaching mylar between the housing of the optical engine and the reflective mirror, or by adjusting the molds for manufacturing the housing of the optical engine to change the angle at which the reflective mirror is placed. However, these solutions normally require much time and cost.

Another solution is shown in FIGS. 1A and 1B, a conventional adjustable reflective mirror module 100 is installed on an optical engine housing 200. The reflective mirror module 100 includes a fixing support 110, a reflective mirror 120, a spring 130, a gasket 140, a fixing screw 150, and a plurality of adjusting screws 160. The fixing support 110 has a fixing groove 112 for fixing the reflective mirror 120 and a screwing portion 114 at the bottom. The screwing portion 114 of the fixing support 110 passes through the through holes 202 of the optical engine housing 200, and is exposed outside the optical engine housing 200. The fixing screw 150 is secured in the screwing portion 114 after passing through the gasket 140 and the spring 130, so as to fix the spring 130 between the position rib 206 of the optical engine housing 200 and the gasket 140. The adjusting screws 160 are screwed in the threaded holes 204 of the optical engine housing 200. By screwing the adjusting screws 160 into or out from the threaded holes 204, the angle at which the reflective mirror 120 is placed is adjusted.

However, when the conventional reflective mirror module 100 is assembled, the threaded holes 204 and the position rib 206 have to be added to the optical engine housing 200. Normally, the threaded holes 204 and the position rib 206 influence the molding process of the optical engine housing 200. Therefore, it is quite difficult to design and manufacture the reflective mirror module.

SUMMARY OF THE INVENTION

The present invention is directed to provide a reflective mirror module capable of being precisely fixed on a housing through the adjustment of adjusting screws.

The present invention is also directed to provide a projection apparatus that needs not to arrange threaded holes and position ribs on the housing of an optical engine, and is easier to be manufactured.

The present invention provides a reflective mirror module disposed on a housing having a plurality of through holes. The reflective mirror module of the present invention includes a fixing support, a reflective mirror, an adjusting leaf spring, and a plurality of adjusting screws. The fixing support has a plurality of threaded holes, and the positions of the threaded holes are corresponding to the positions of the through holes. The reflective mirror is disposed on the fixing support, and the adjusting leaf spring is disposed between the fixing support and the housing for maintaining a distance existing between the fixing support and the housing. The adjusting leaf spring has a plurality of guiding openings, and the positions of the guiding openings are corresponding to the positions of the threaded holes. Moreover, the adjusting screws pass through the through holes and the guiding openings, and are secured in the threaded holes of the fixing support.

The present invention also provides a projection apparatus, including an optical engine housing having a plurality of through holes, an optical engine for providing images, and a projection lens disposed on the transmission path of the images. The optical engine has the aforementioned reflective mirror module, which is disposed on the optical engine housing. The optical engine is, for example, a digital light processing (DLP) optical engine or a liquid crystal display (LCD) optical engine.

As the reflective mirror module of the present invention has the leaf spring and the adjusting screws, the reflective module of the present invention is fixed on the housing or the optical engine housing quite precisely. In addition, the reflective mirror module of the present invention is very convenient and time-saving to assemble and adjust.

Other objectives, features and advantages of the present invention will be further understood from the further technology features disclosed by the present invention wherein there are shown and described preferred embodiments of this invention, simply by way of illustration of modes best suited to carry out the invention.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1B:
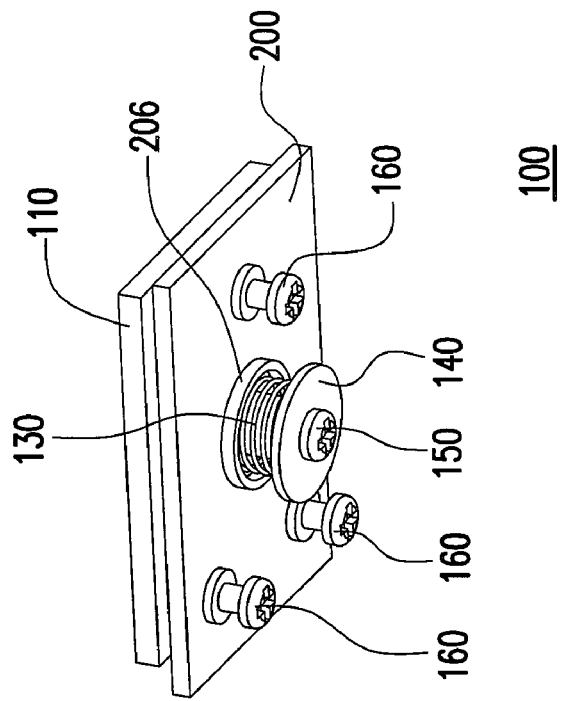
FIG. 1B is a schematic view of a conventional reflective mirror module.
Figure 1A:
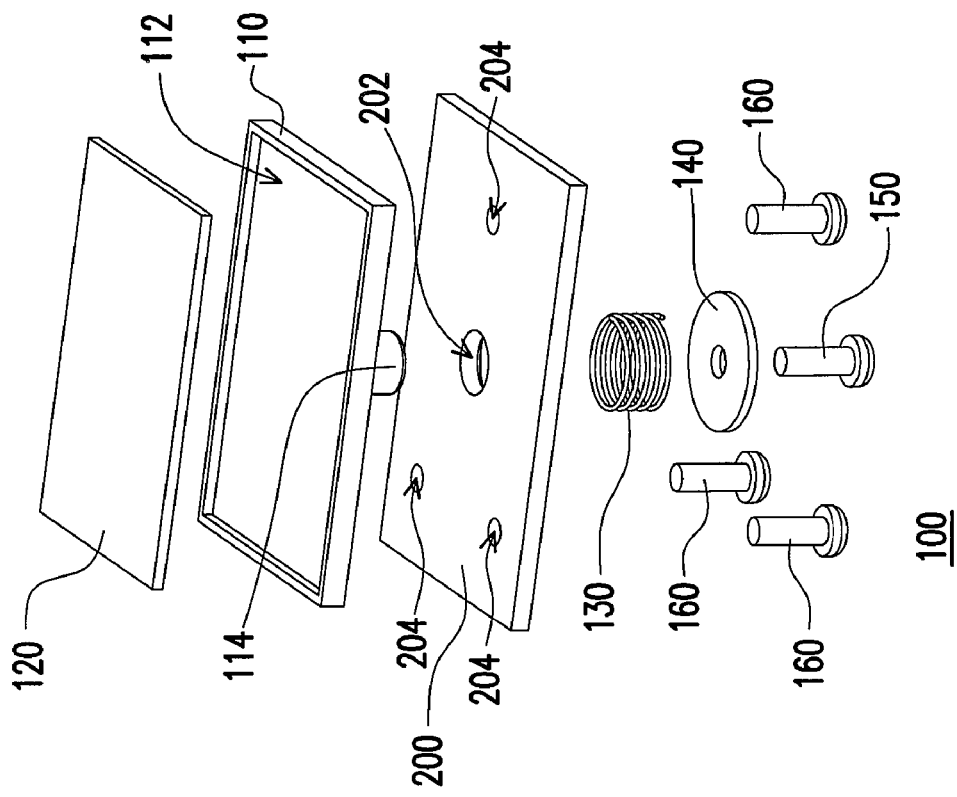
FIG. 1A is a schematic exploded view of a conventional reflective mirror module.
Figures 2A, 2B:
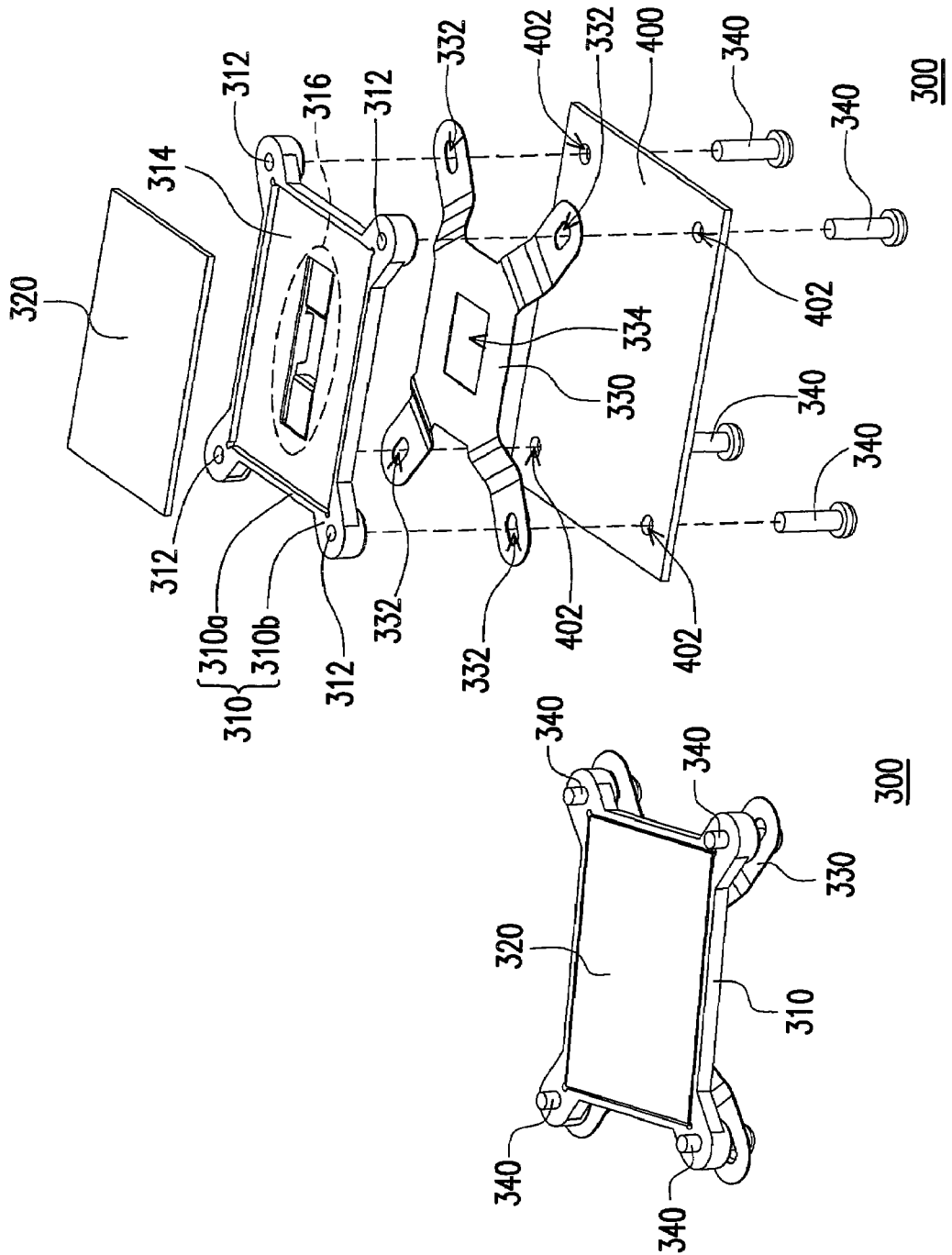
FIG. 2A is a schematic view of a reflective mirror module of the present invention.
FIG. 2B is a schematic exploded view of a reflective mirror module of the present invention.

Referring to FIGS. 2A and 2B, a reflective mirror module 300 of the present invention is disposed on a housing 400 having a plurality of through holes 402. The reflective mirror module 300 includes a fixing support 310, a reflective mirror 320, a leaf spring 330, and a plurality of adjusting screws 340. The fixing support 310 has a plurality of threaded holes 312, and the positions of the threaded holes 312 are corresponding to the positions of the through holes 402. The reflective mirror 320 is disposed on the fixing support 310, and the leaf spring 330 is disposed between the fixing support 310 and the housing 400 for maintaining a distance existing between the fixing support 310 and the housing 400. The leaf spring 330 has a plurality of guiding openings 332, and the positions of the guiding openings 332 are corresponding to the positions of the threaded holes 312. Moreover, the adjusting screws 340 pass through the through holes 402 and the guiding openings 332, and are secured in the threaded holes 312 of the fixing support 310.

The fixing support 310 has a fixing groove 314 with a profile corresponding to the reflective mirror 320, and the reflective mirror 320 is disposed in the fixing groove 314 of the fixing support 320. For example, when the reflective mirror 320 is a rectangular mirror, the fixing groove 314 of the fixing support 310 is a rectangular fixing groove 314. For example, the reflective mirror 320 is adhered to the fixing groove 314 with an adhesive, or is fixed in the fixing groove 314 with other mechanical members.

As shown in FIG. 2B, the fixing support 310 includes a rectangular body 310a and a plurality of lugs 310b. The fixing groove 314 is located in the rectangular body 310a, the lugs 310b protrude from four corners of the edges of the rectangular body 310a, and the threaded holes 312 are located in the lugs 310b. It should be noticed that the fixing support 310 of the present invention is not limited to the configuration as shown in FIG. 2B, i.e., any fixing support 310 capable of carrying the reflective mirror 320 and having the threaded holes 312 is applied in the architecture of FIG. 2B.

Figure 3:
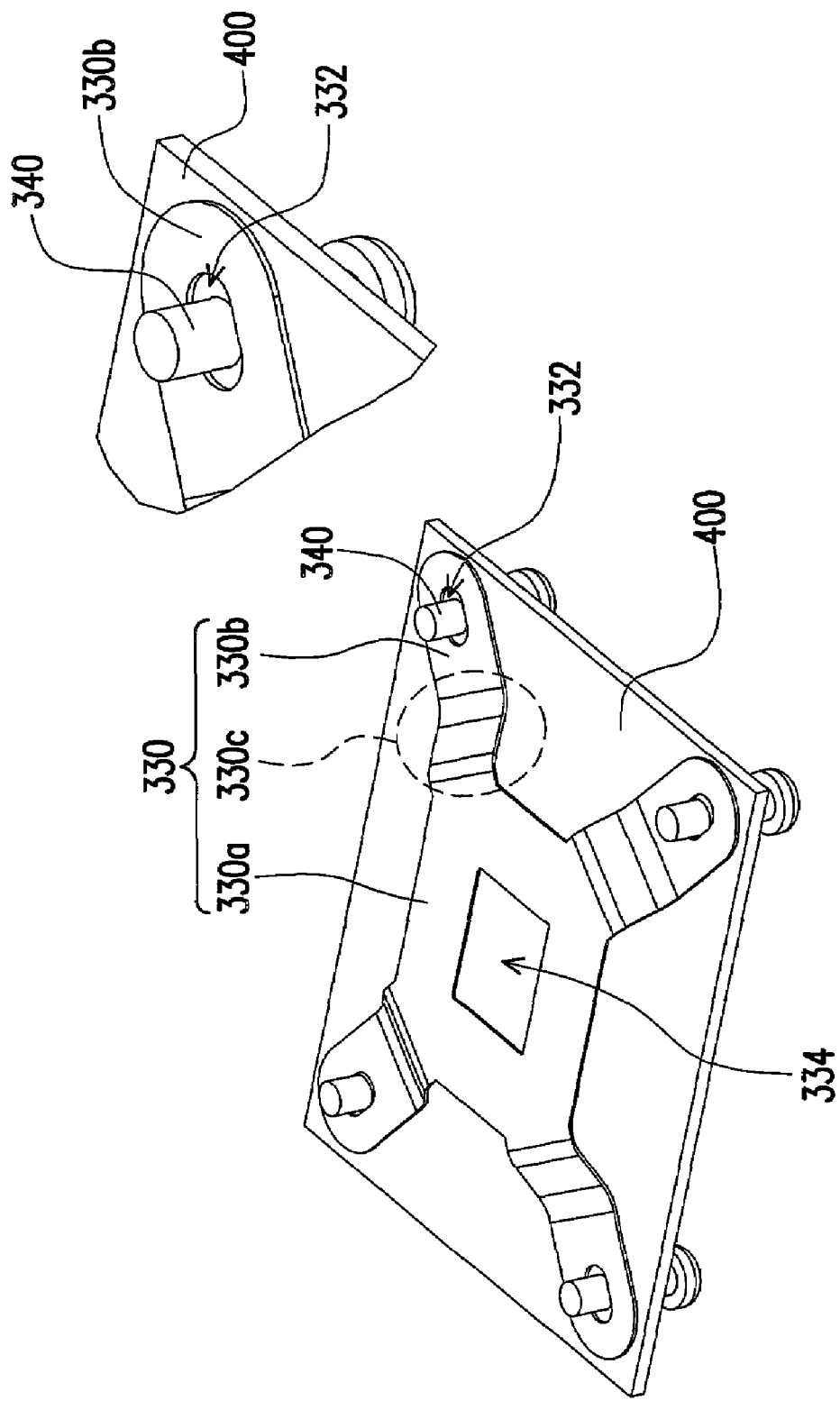
FIG. 3 is a schematic view of the adjusting screws passing through the guiding openings of the adjusting leaf spring.

Referring to FIG. 3, the leaf spring 330 includes a first support portion 330a fixed on the fixing support 310, a plurality of second support portions 330b leaning against the housing 400, and a plurality of deformation portions 330c. The leaf spring 330 is made of metal, plastic or other materials with fine elasticity. The first support portion 330a has a position hole 334, and the fixing support 310 has a position portion 316. The position portion 316 is embedded in the position hole 334 to prevent the relative displacement between the fixing support 310 and the first support portion 330a. The fixing support 310 and the first support portion 330a are also jointed with an adhesive, or be fixed with other mechanical members. The deformation portions 330c are connected between the first support portion 330a and the second support portions 330b for maintaining a distance between the fixing support 310 and the housing 400. The deformation portions 330c and the second support portions 330b protrude from the edges of the first support portion 330a, and the guiding openings 332 of the leaf spring 330 are located in the second support portions 330b. All of the second support portions 330b are in a same plane, the first support portion 330a is in another plane, and the deformation portions 330c connected between the first support portion 330a and the second support portions 330b extend from the plane where the first support portion 330a is to the plane where the second support portions 330b are. However, the configuration of the leaf spring 330 is not limited in the present invention, i.e., any elastic component allowing the adjusting screws 340 to pass through and allowing the fixing support 310 to float on the housing 400 is applied in the reflective mirror module 300 of the present invention.

Figure 4A:
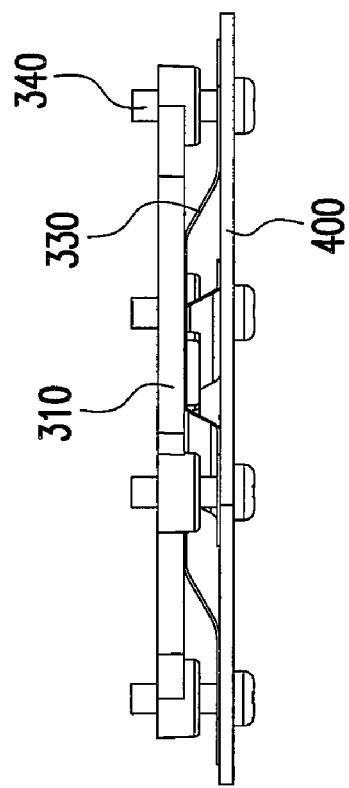
FIGS. 4A and 4B are schematic sectional views of the reflective mirror module in different states.
Figure 4B:
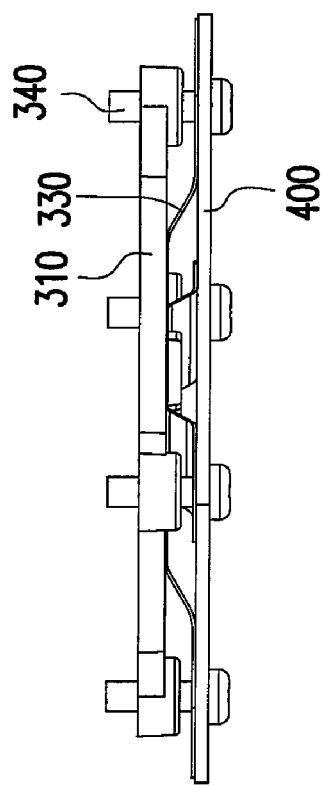

When the angle at which the reflective mirror 320 is placed on the fixing support 310 needs to be adjusted, at least one of the adjusting screws 340 is screwed into the threaded holes 312 towards the direction of the threaded holes (i.e., fastened), such that the first support portion 330a is pressed and moves towards the direction of the housing 400 (sinks), and the distance between the housing 400 and the fixing support 310 is reduced. At this time, deformation is generated in the deformation portions 330c accordingly, and the second support portions 330b extend outwardly (as shown in FIG. 4A). Certainly, at least one of the adjusting screws 340 is also screwed out of the threaded holes 312 against the direction of the threaded holes (i.e., loosened). At this time, the restoring force provided by the deformation portions 330c makes the fixing support 310 and the first support portion 330a move in the direction away from the housing 400 (rise), such that the distance between the housing 400 and the fixing support 310 is increased, and the second support portions 330b retract inwardly (as shown in FIG. 4B).

To enable the second support portions 330b of the leaf spring 330 to extend outwardly or retract inwardly easily, the diameter of the guiding openings 332 are designed to be greater than the diameter of the adjusting screws. Thus, when the adjusting screws 340 pass through the guiding openings 332, the adjusting screws 340 are not fully fill the guiding openings 332, and the space not filled by the adjusting screws 340 in the guiding openings 332 is used in the slide of the adjusting leaf spring 330.

The reflective mirror module 300 of the present invention is applied in any optical system, such as lenses and projection apparatuses. Taking the projection apparatus as an example, the reflective mirror module 300 of the present invention is applied in a DLP projection apparatus or an LCD projection apparatus.

Figure 5A:
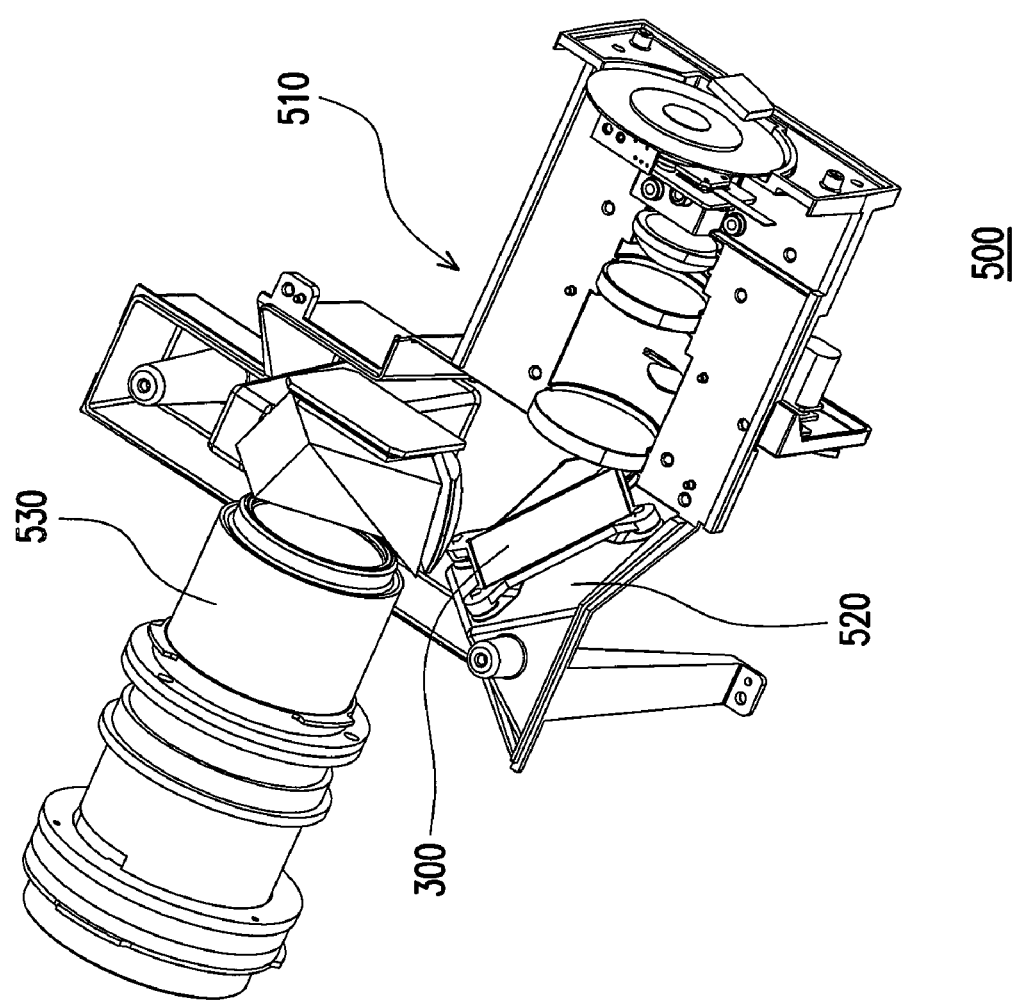
FIG. 5A is a schematic view of the projection apparatus according to the present invention.
Figure 5B:
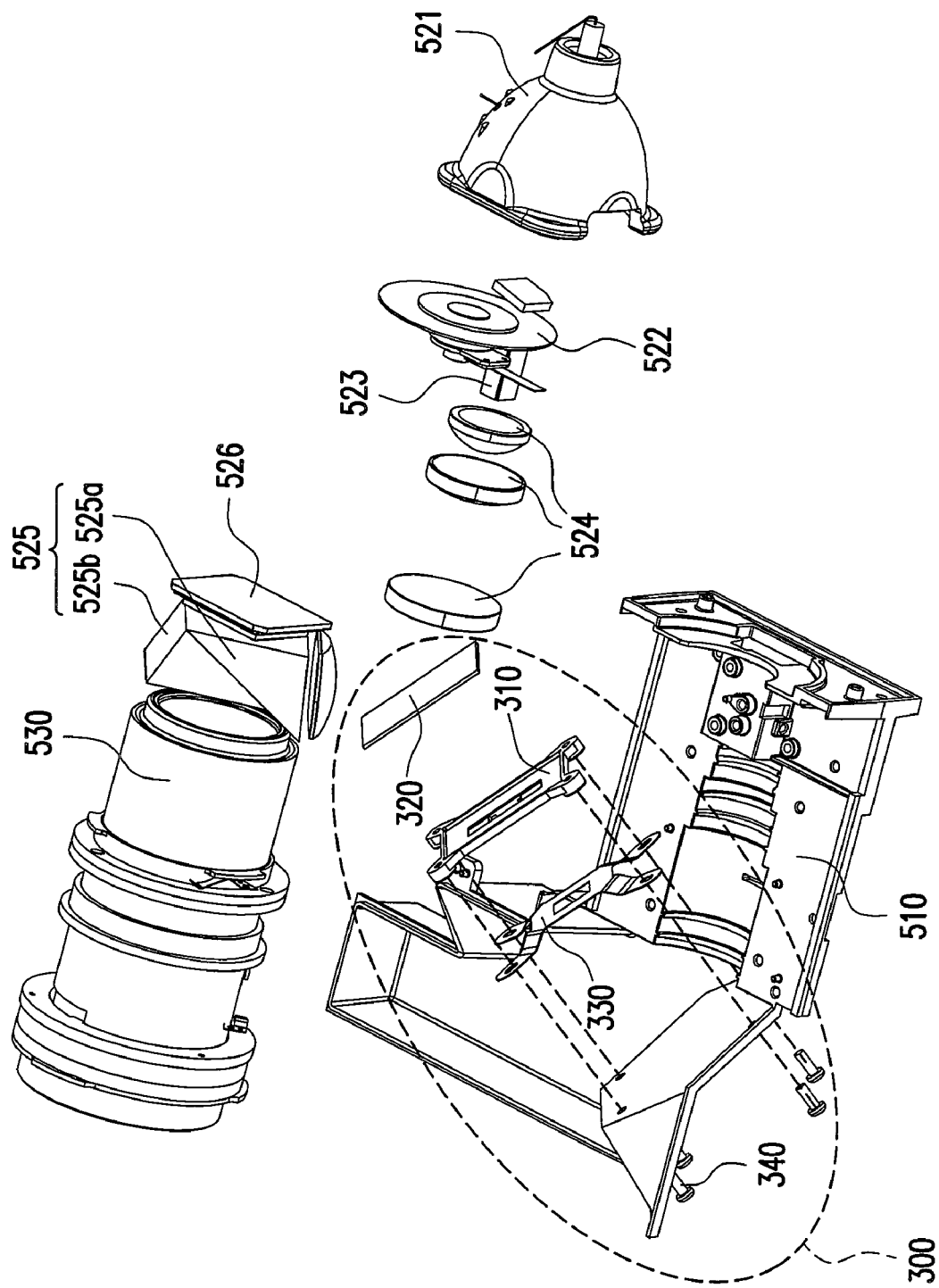
FIG. 5B is an exploded view of the projection apparatus according to the present invention.

Referring to FIGS. 5A and 5B, a projection apparatus 500 provided in the present invention includes an optical engine housing 510 having a plurality of through holes, an optical engine 520 for providing images, and a projection lens 530 disposed on the transmission path of the images. The optical engine 520 has the reflective mirror module 300 of FIG. 2A, and the reflective mirror module 300 is disposed on the inner wall of the optical engine housing 510. In particular, the optical engine 520 is, for example, a DLP optical engine including a light source 521, a color wheel 522, an optical integrated rod 523, a lens 524, the reflective mirror module 300, a TIR prism 525, and a digital micro-mirror device (DMD) 526. Certainly, the optical engine 520 is an LCD optical engine including a light source, a light splitting device, a light combining device, the reflective mirror module 300, and an LCD panel.

As known from FIG. 5B, the light beam provided by the light source 521 passes through the color wheel 522, the optical integrated rod 523, and the lens 524 sequentially, and is transmitted to the reflective mirror 320 in the reflective mirror module 300, and the reflective mirror 320 reflects the light beam into the TIR prism 525. Generally, the TIR prism 525 is composed by a prism 525a and a prism 525b, and the joint of the prism 525a and the prism 525b has an air gap, such that the light beam entering the TIR prism 525 from the prism 525a is totally reflected to the DMD 526. Then, the images processed by the DMD 526 pass through the TIR prism 525 (the prism 525a, the prism 525b, and the air gap), and are projected with the projection lens 530.

Figure 6:
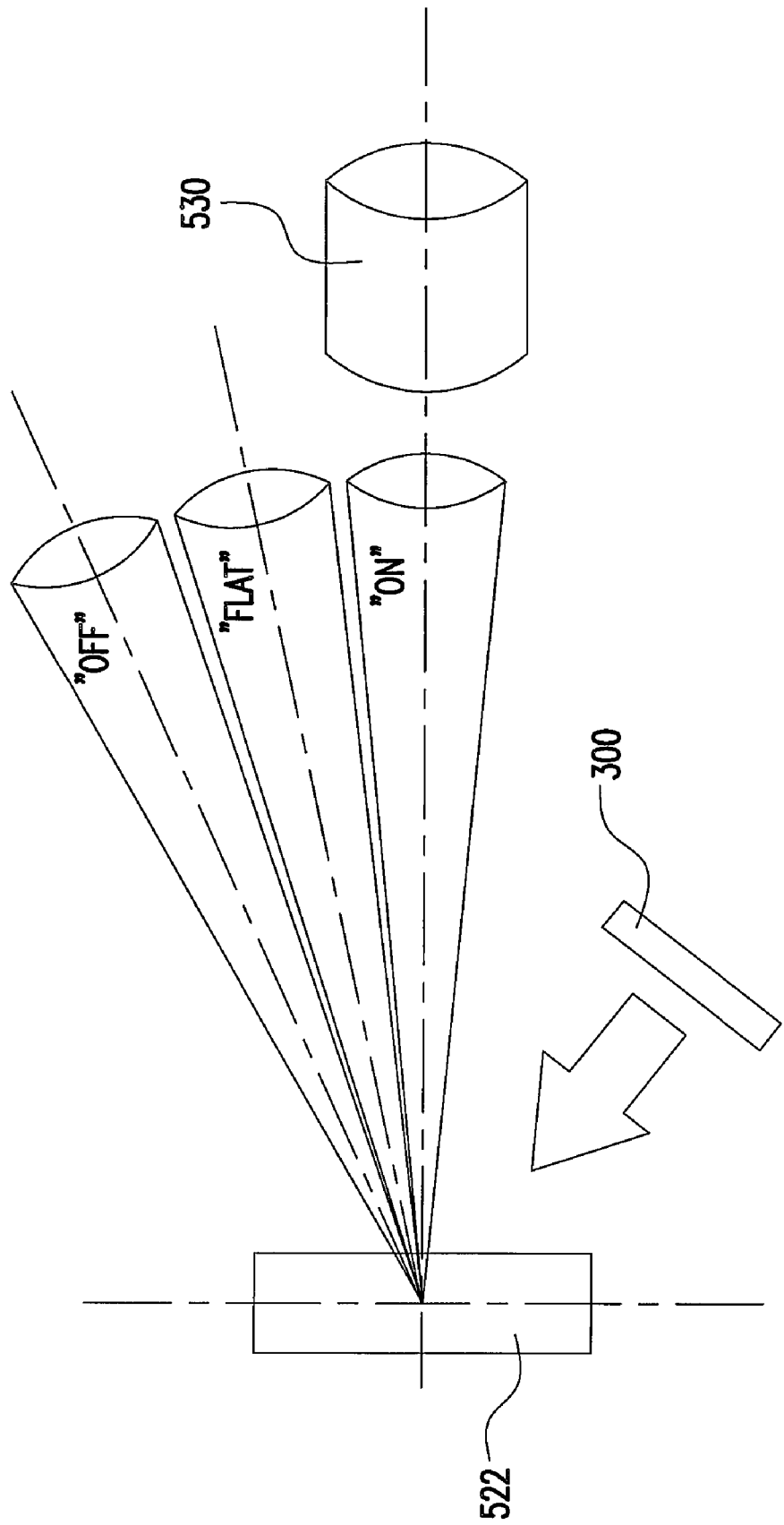
FIG. 6 is a schematic view of the ON state light beams, the FLAT state light beams, the OFF state light beams, the DMD, and the projection lens in the projection apparatus.
Figure 7A:
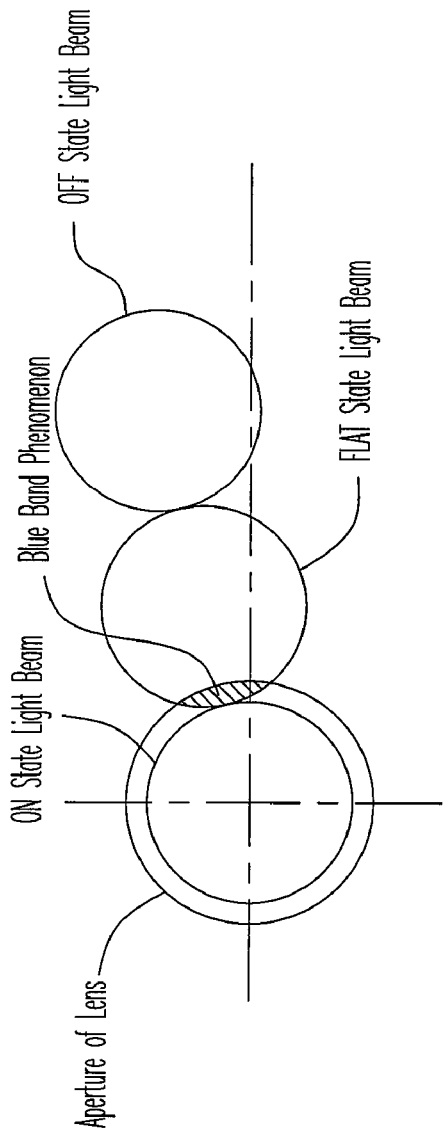
FIG. 7A is a schematic view of the ON state light beams, the FLAT state light beams, the OFF state light beams, and the aperture of the lens before the reflection lens is adjusted.
Figure 7B:
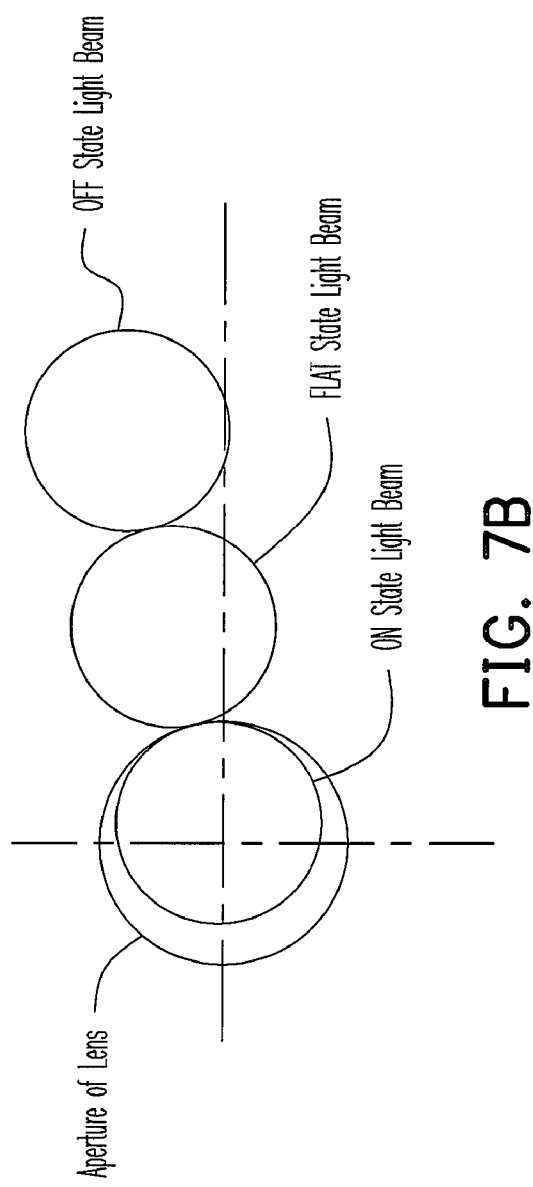
FIG. 7B is a schematic view of the ON state light beams, the FLAT state light beams, the OFF state light beams, and the aperture of the lens after the reflection lens is adjusted.

Referring to FIGS. 5A, 5B, and 6, in the DLP optical engine 520, the reflected light beams in different directions are reflected from the micro-mirror above the DMD 526 according to the angles at which the micro-mirror is placed. Normally, there are three types of the light beams, namely, the ON state light beams, the FLAT state light beams, and the OFF state light beams. To improve the luminance of the images projected from the projection apparatus 500, the aperture of the projection 530 normally is designed to be greater than the sectional area of the ON state light beams. However, when the aperture of the projection lens is greater than the sectional area of the ON state light beams, a part of the FLAT state light beams pass through the projection lens, and the blue band phenomenon occurs (as shown in FIG. 7A). At this time, the reflective mirror module 300 is adjusted to enable the ON state, FLAT state, and OFF state light beams to deviate towards a particular direction synchronically (as shown in FIG. 7B), so as to prevent the FLAT state light beams from being incident on the projection lens, thus the aforementioned problem of blue band phenomenon is solved.

To sum up, the reflective mirror module and the projection apparatus of the present invention at least have the following advantages.

1. The reflective mirror module of the present invention needs no gaskets or springs, so it is unnecessary to fabricate threaded holes and position ribs on the housing. Therefore, the reflective mirror module and the housing are easier to be designed and manufactured.

2. The adjusting screws in the reflective mirror module of the present invention facilitate the convenience for assembly and adjustment, thus the time for assembly and adjustment is saved.

3. The reflective mirror module of the present invention rapidly and effectively prevents the problem of blue band phenomenon of the projection apparatus.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A reflective mirror module, disposed on a housing having a plurality of through holes, comprising:
 a fixing support, having a plurality of threaded holes, wherein the positions of the threaded holes are corresponding to the positions of the through holes;
 a reflective mirror disposed on the fixing support;
 a leaf spring disposed between the fixing support and the housing, wherein the leaf spring has a plurality of guiding openings, the positions of the guiding openings are corresponding to the positions of the threaded holes, and the leaf spring comprises:
  a first support portion fixed on the fixing support;
  a plurality of second support portions leaning against the housing, wherein the guiding openings are located in the second support portions; and
  a plurality of deformation portions connected between the first support portion and the second support portions for maintaining a distance between the fixing support and the housing, wherein the first support portion has a position hole, the fixing support has a position portion, and the position portion is embedded in the position hole; and a plurality of adjusting screws, passing through the through holes and the guiding openings, and secured in the threaded holes of the fixing support.

2. The reflective mirror module as claimed in claim 1, wherein the fixing support has a fixing groove, and the reflective mirror is disposed in the fixing groove of the fixing support.

3. The reflective mirror module as claimed in claim 2, wherein the fixing support comprises:
   a rectangular body, wherein the fixing groove is located in the rectangular body; and
   a plurality of lugs protruding from corners of the rectangular body, wherein the threaded holes are located in the lugs.

4. The reflective mirror module as claimed in claim 1, wherein the diameter of the guiding openings is greater than the diameter of the adjusting screws, when the adjusting screws are screwed into or out of the threaded holes, the first support portion of the leaf spring moves towards or away from a direction of the housing, and the second support portions of the leaf spring extends outwardly or retracts inwardly.

5. A projection apparatus, comprising:
   an optical engine housing, having a plurality of through holes;
   an optical engine, for providing an image, wherein the optical engine is disposed in the optical engine housing, and the optical engine has a reflective mirror module disposed on the optical engine housing, and the reflective mirror module comprises:
      a fixing support, having a plurality of threaded holes, wherein the positions of the threaded holes are corresponding to the positions of the through holes;
      a reflective mirror disposed on the fixing support;
      a leaf spring disposed between the fixing support and the optical engine housing, wherein the leaf spring has a plurality of guiding openings, the positions of the guiding openings are corresponding to the positions of the threaded holes, and the leaf spring comprises:
         a first support portion fixed on the fixing support;
         a plurality of second support portions leaning against the optical engine housing, wherein the guiding openings are located in the second support portions; and
         a plurality of deformation portions connected between the first support portion and the second support portions for maintaining a distance between the fixing support and the housing. wherein the first support portion has a position hole. the fixing support has a position portion, and the position portion is embedded in the position hole; and
      a plurality of adjusting screws, passing through the through holes and the guiding openings, and secured in the threaded holes of the fixing support; and
   a projection lens, disposed on a transmission path of the image.

6. The projection apparatus as claimed in claim 5, wherein the fixing support has a fixing groove, and the reflective mirror is disposed in the fixing groove of the fixing support.

7. The projection apparatus as claimed in claim 6, wherein the fixing support comprises:
   a rectangular body, wherein the fixing groove is located in the rectangular body; and
   a plurality of lugs protruding from corners of the rectangular body, wherein the threaded holes are located in the lugs.

8. The projection apparatus as claimed in claim 5, wherein the diameter of the guiding openings is greater than the diameter of the adjusting screws, when the adjusting screws are screwed into or out of the threaded holes, the first support portion of the leaf spring moves towards or away from a direction of the housing, and the second support portions of the leaf spring extends outwardly or retracts inwardly.

9. The projection apparatus as claimed in claim 5, wherein the optical engine comprises a digital light processing (DLP) optical engine or a liquid crystal display (LCD) optical engine.

* * * * *